(12) United States Patent
Sacca

(10) Patent No.: US 6,647,114 B1
(45) Date of Patent: Nov. 11, 2003

(54) TELEPHONE LINE INTERFACE CIRCUIT WITH VIRTUAL IMPEDANCE

(75) Inventor: Frank Sacca, Diamond Bar, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/312,218

(22) Filed: May 14, 1999

(51) Int. Cl.[7] .................................................. H04M 1/76
(52) U.S. Cl. ....................................... 379/398; 379/394
(58) Field of Search ................................... 379/398, 394

(56) References Cited

U.S. PATENT DOCUMENTS

| | | | |
|---|---|---|---|
| 4,359,609 A | * 11/1982 | Apfel | 379/398 |
| 4,528,424 A | 7/1985 | Middleton et al. | 379/183 |
| 4,607,140 A | 8/1986 | Schorr | 379/400 |
| 4,607,141 A | 8/1986 | Schorr | 379/398 |
| 5,349,638 A | 9/1994 | Pitroda et al. | 379/142.16 |
| 5,351,289 A | 9/1994 | Logsdon et al. | 379/142.04 |
| 5,361,296 A | 11/1994 | Reyes et al. | 379/93.29 |
| 5,369,666 A | 11/1994 | Folwell et al. | 375/222 |
| 5,410,594 A | * 4/1995 | Maruyama | 379/398 |
| 5,473,552 A | 12/1995 | Chen et al. | 375/222 |
| 5,544,241 A | 8/1996 | Dibner et al. | 379/373.01 |
| 5,546,448 A | 8/1996 | Caswell et al. | 379/142.05 |
| 5,675,640 A | 10/1997 | Tappert et al. | 379/374.01 |
| 5,764,694 A | 6/1998 | Rahamim et al. | 375/224 |
| 5,771,281 A | 6/1998 | Batten, Jr. | 379/93.23 |
| 5,781,621 A | 7/1998 | Lim et al. | 379/142.04 |
| 5,790,656 A | 8/1998 | Rahamim et al. | 379/399.01 |
| 5,796,815 A | 8/1998 | Guercio et al. | 379/372 |
| 5,799,060 A | 8/1998 | Kennedy et al. | 379/29.05 |
| 6,205,218 B1 | * 3/2001 | Fischer et al. | 379/398 |

* cited by examiner

*Primary Examiner*—Minsun Oh Harvey
*Assistant Examiner*—Daniel Swerdlow
(74) *Attorney, Agent, or Firm*—Farjami & Farjami LLP

(57) ABSTRACT

Using a telephone line interface circuit with negative feedback, it is possible to control the current through the circuit so that the ratio of the voltage applied across the circuit to the current is the desired value of impedance. Voltage feedback from the line controls the current through the circuit, thereby reflecting a "virtual" impedance to the telephone line. By adequately filtering the voltage feedback, the reflected impedance to the line can be adjusted to any desired impedance function, without using the actual values of the impedance. The circuit is thus ideally suited for applications in which the impedance values need to be varied depending upon the characteristics of the telephone system.

3 Claims, 7 Drawing Sheets

TELEPHONE LINE INTERFACE CIRCUIT WITH VIRTUAL IMPEDANCE

CROSS-REFERENCE TO RELATED APPLICATIONS

This application is related to U.S. patent application Ser. No. 09/212,707, entitled, TELEPHONE LINE INTERFACE CIRCUIT WITHOUT HOOKSWITCH, filed Dec. 16, 1998; and patent application Ser. No. 09/312,136, entitled, ELECTRONIC INDUCTOR WITH TRANSMIT SIGNAL TELEPHONE LINE DRIVER, filed May 14 1999. These applications are commonly owned and are assigned to the assignee of the present application. The disclosure of these applications are herein incorporated by reference.

BACKGROUND OF THE INVENTION

1. Field of the Invention

The subject invention relates generally to the field of communications and more particularly to a telephone line interface circuit capable of complying with various impedance requirements worldwide.

2. Description of Related Art

A telephone line interface circuit must have a specified DC resistance and AC impedance when connected to a telephone network, which in general have different values. For example, the Federal Communications Commission in the United States specifies a DC resistance of 300 ohms or less, and an AC impedance equivalent to a resistive 600 ohms. Most countries worldwide adopt these specifications, but a number of countries instead require a complex network for AC impedance.

A conventional line interface circuit generally includes an electronic inductor (or "gyrator") and a passive network. The electronic inductor determines the DC resistance of the circuit, whereas the passive network determines its AC impedance.

A typical electronic inductor circuit is shown in FIG. 1. Resistors R1 and R2 form a voltage divider with respect to a DC line voltage VTR, and set a DC bias voltage VB at the base of transistor Q1. A bypass capacitor C1 filters out any AC signals Vb that result from an AC signal Vtr on the telephone line voltage. The current IC through the transistor Q1 is approximately equal to the ratio of emitter voltage VE over the emitter resistor RE. The emitter voltage VE can be calculated as VE=VB−0.7V. Since the AC voltage at VB is completely filtered out by capacitor C1, the current through the transistor Q1 will be only DC. If resistors R1 and R2 are chosen to be large, the current through the bias network becomes negligible with respect to IC, and the line current ITR is approximately equal to IC. The effective impedance of the electronic inductor, therefore, can be obtained as the ratio of VTR over ITR. It is apparent from the latter equation that the DC resistance is a finite value, whereas the AC impedance approaches infinity because the AC current Itr through the electronic inductor is close to zero. Hence, the circuit is called an "electronic inductor" since it passes DC, but blocks AC.

A typical passive network used as AC impedance in a telephone line interface circuit is shown in FIG. 2. In its simplest form, this network is comprised of a 600-ohm resistive load R3 in series with a large coupling capacitor C2, generally 100uF or higher. The network is terminated to AC ground and is effectively in parallel with the electronic inductor of FIG. 1. In this configuration, an incoming AC signal from the telephone line "sees" a resistive impedance equivalent to the value of R3. In general, the resistive load R3 is required to be a complex impedance X having the configuration shown in FIG. 3. This complex network is required in Europe and certain other countries worldwide.

In modem applications, such as a computer modem, it is desirable that a line interface circuit complies with the impedance requirements of multiple countries worldwide. Otherwise, a different line interface circuit would have to be designed for use in every country. One solution is to use a plurality of passive networks with switches that select the impedance specific for the country where the circuit is expected to operate, as shown in FIG. 4. Based on a country code entered by the user, a microcontroller (not shown) enables the impedance desired through control lines IS1, IS2, and IS3, which enables a 600-ohm resistive impedance, a complex network X, or any arbitrary impedance network Y, respectively.

The circuit just described does not include a line driver to transmit signals to the telephone line. Two configurations incorporating a line driver TXA are shown in FIG. 5 (A) and FIG. 5 (B), respectively. In FIG. 5 (A), the AC ground of the switches is connected to the output of the transmit driver TXA, which is effectively an AC ground with respect to the line signal. In FIG. 5 (B), the transmit driver TXA transmits signals to the line through the electronic inductor circuit, specifically through the base of the transistor Q1.

The circuits just described exhibit a number of drawbacks, especially when considered in the context of lightning protection requirements. First, the coupling capacitor C3 of the impedance network is too large and expensive. Depending on the protection circuit used, the rating required of this capacitor could be as high as 300V. Additionally, the 600-ohm and other worldwide complex impedance networks are too small when compared to lightning voltages, resulting in excessive current that must be adequately limited with other protection devices. Furthermore, the impedance selection switches SW1, SW2, and SW3 are expensive because they must satisfy high voltage and current ratings as well. Lastly, in the configuration of FIG. 5 (A), the transmit driver TXA must have a relatively low output impedance in order to drive the 600-ohm resistive load and the line impedance directly.

SUMMARY OF THE INVENTION

Using a telephone line interface circuit with negative feedback makes it possible to control the current through the circuit so that the ratio of the voltage applied across the circuit to the current is the desired value of impedance. Voltage feedback from the line controls the current through the circuit, thereby reflecting a "virtual" impedance to the telephone line. By adequately filtering the voltage feedback, the reflected impedance to the line can be adjusted to any desired impedance function, without using the actual values of the impedance.

In a preferred embodiment, a selectable impedance network is included to provide for worldwide compatibility in a single circuit. The impedance network may be implemented using either passive or active components. The transmit signal is preferably applied to a positive input of an operational amplifier connected to the base of the electronic inductor transistor.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein:

FIG. 5 (B) is a schematic circuit diagram of the circuit shown in 5(A), except the transmit driver is connected to the base of the electronic inductor transistor;

FIG. 7 (B) is a schematic circuit diagram illustrating a virtual impedance electronic inductor circuit having an active transistor driver;

FIG. 7 (C) is a schematic circuit diagram illustrating a virtual impedance electronic inductor circuit with a transmit line driver;

FIG. 9 (B) is a schematic circuit diagram of an active virtual impedance electronic inductor circuit having a receive buffer;

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a telephone line interface circuit capable of complying with various impedance requirements worldwide.

Constructing a line interface circuit with negative feedback, it is possible to control the current through the circuit so that the ratio of the voltage applied across the circuit to the current is the desired value of impedance. Voltage feedback from the line controls the current through the circuit, thereby reflecting a "virtual" impedance to the telephone line. As used herein the term "virtual impedance" refers to this reflected impedance. By adequately filtering the voltage feedback, the reflected impedance to the line can be adjusted to any desired impedance function, without using the actual values of the impedance.

Another advantage of a virtual impedance implementation is that an AC switch is not required in the modem interface circuit to the telephone line. An AC switch, which could be a "hookswitch," physically disconnects the modem AC circuit components from the telephone line interface, when the modem goes on-hook. This switch is required when the AC circuit elements have low impedance, such as the impedance required while the modem is off-hook, i.e., 600 ohms real or worldwide complex network.

Due to the high impedance of the physical components used to reflect virtual impedance, the loading effect on the telephone line caused by these components can be neglected when the modem is on-hook, and therefore a switch is not required. Typically, the impedance of such components can be chosen to be orders of magnitude larger than what is required. As a result, the virtual impedance circuit configuration can be left permanently connected to the telephone line even when the modem is on-hook, provided that the amplifier driver for the AC signal is disabled.

Figure 6:
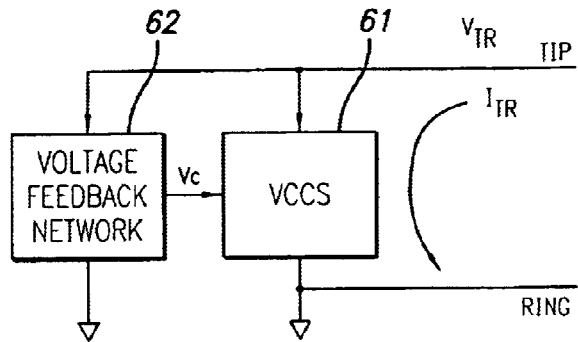
FIG. 6 illustrates a line interface circuit having virtual impedance, according to the present invention.

A block diagram of a circuit that reflects virtual impedance is shown in FIG. 6. A voltage-controlled current source (VCCS) 61 determines the line current as a function of a voltage feedback network 62. Since the impedance seen by the line is the ratio of line voltage over line current, any desired value of impedance can be set by the proper selection of the voltage feedback network 62.

Figure 1:
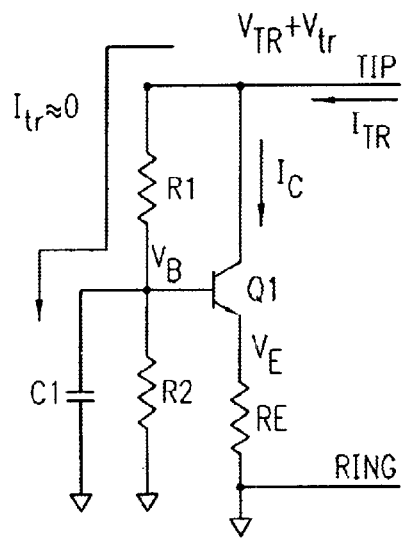
FIG. 1 is a schematic circuit diagram of a typical prior art electronic inductor.
Figure 2:
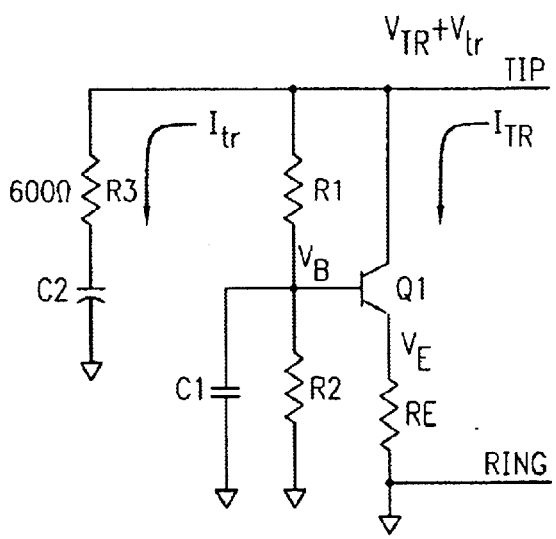
FIG. 2 is a schematic circuit diagram of a prior art electronic inductor circuit combined with a passive AC impedance.
Figure 3:
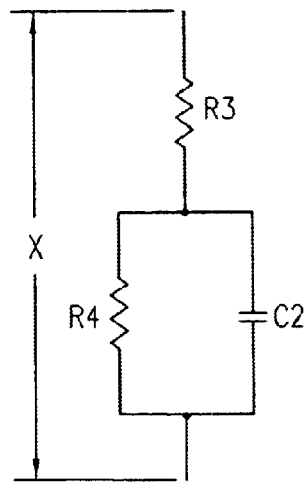
FIG. 3 is a schematic circuit diagram of a prior art complex impedance circuit.
Figure 4:
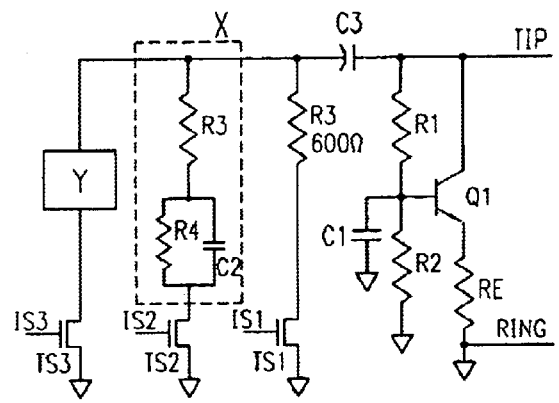
FIG. 4 is a schematic circuit diagram of a prior art electronic inductor circuit having a selectable worldwide impedance network.
Figure 5A:
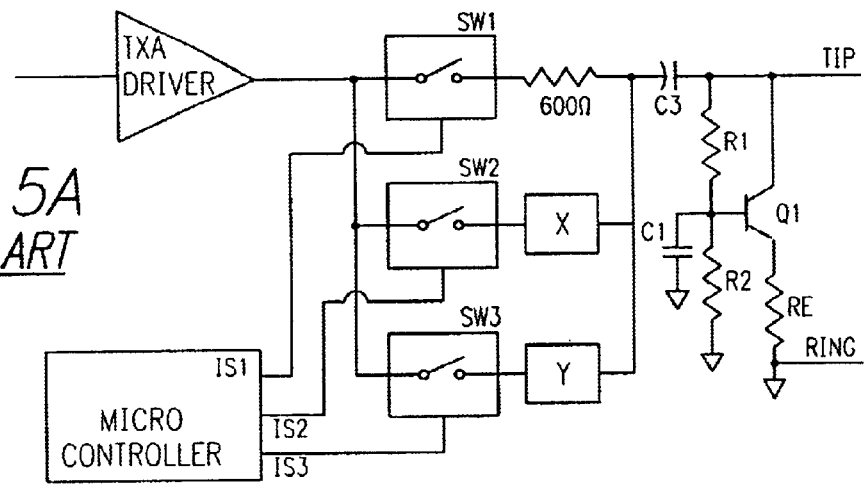
FIG. 5 (A) is a schematic circuit diagram of a prior art electronic inductor circuit having a selectable worldwide impedance network with a transmit line driver.
Figure 5B:
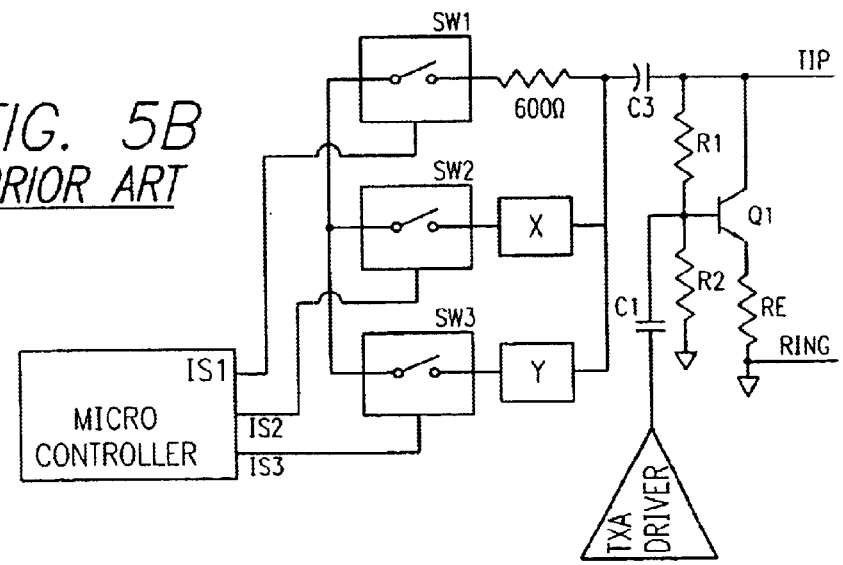
Figure 7A:
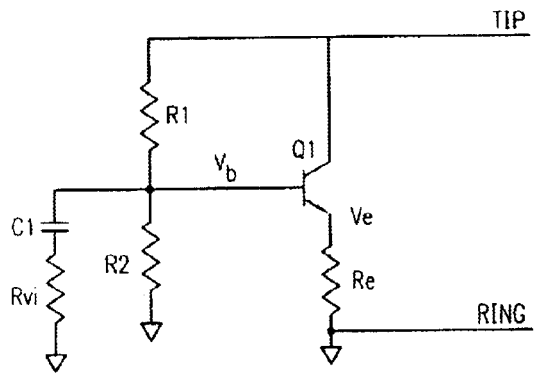
FIG. 7 (A) is a schematic circuit diagram illustrating a simple virtual impedance electronic inductor circuit, according to the present invention.
Figure 7B:
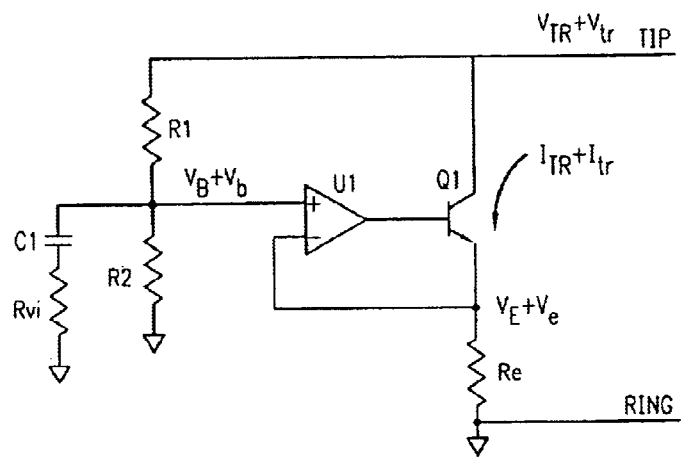
Figure 7C:
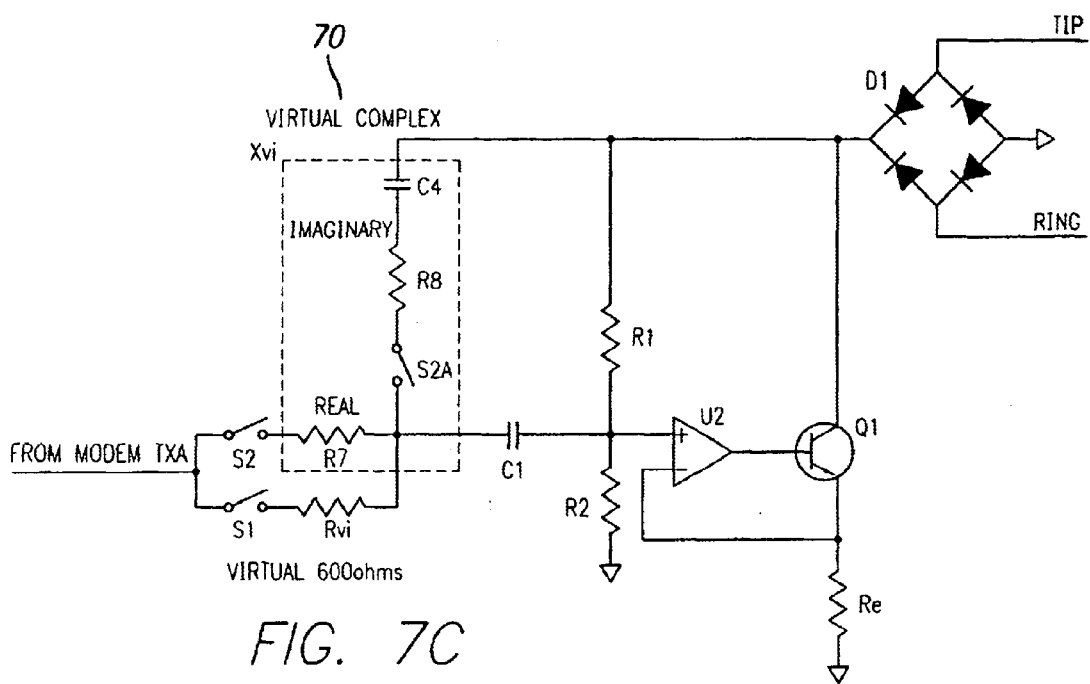

A simple virtual impedance configuration according to the present invention can be implemented with an electronic inductor, as shown in FIG. 7 (A). Assuming that the transistor Q1 has a large beta, the current through resistors R1 and R2 is negligible and the line current can be considered equal to the transistor current. Unlike the standard electronic inductor configuration shown in FIG. 1, the resistor Rvi prevents AC signals Vb at the base of Q1 from being shunted to ground by capacitor C1. The residual AC signal Vb is transmitted unchanged to the emitter of Q1 as Ve (emitter follower). The value of Ve divided by Re determines the AC current through Q1. The AC voltage applied from the line divided by the AC current through Q1 is the virtual impedance of this circuit and is determined by the value of Rvi. Note that the virtual impedance value is not the same as Rvi, but rather a value reflected by Rvi.

The circuit in FIG. 7(B) implements virtual impedance with an active electronic inductor driver. Operational amplifier UI converts the voltage Vb to the current required to drive the base of the transistor Q1, so that the voltage Vb is equal to Ve (due to the virtual ground property of operational amplifiers). The resistors R1 and R2 can be chosen to be very large to make the current through them negligible compared to the current through Q1, so that the equations calculated above become sufficiently accurate. With these assumptions, the DC resistance reflected to the line can be calculated as:

DC Resistance=$VTR/ITR$, where $ITR=VE/Re=VB/Re$. Since $VB=[R2/(R1+R2)]\times VTR$, then $ITR=\{[R2/(R1+R2)]\times VTR\}/Re$, and DC Resistance=$[R2/(R1+R2)]/Re$.

The AC impedance reflected to the line can be calculated as:

AC Impedance=$Vtr/Itr$, where $Itr=Ve/Re=Vb/Re$.

Since C1 is large compared to Rvi, resistor R2 can be considered in parallel (//) with resistor Rvi for AC signals, and $$Vb=\{(R2//Rvi)/[R1+(R2//Rvi)]\} \times Vtr. \text{ Substituting } Vb \text{ in the equation for } Itr,$$

$$Itr=Vb/Re=\{(R2//Rvi)/[R1+(R2//Rvi)]\} \times (Vtr/Re), \text{ and}$$

$$AC \text{ Impedance}=\{(R2//Rvi)/[R1+(R2//Rvi)]\}/Re.$$

Note that the virtual impedance value reflected to the line can be adjusted independently of the DC impedance using resistor Rvi. Also, Rvi can be chosen to be arbitrarily larger than a 600-ohm value, depending on the values selected for R1 and R2. Consequently, coupling capacitor C1 can be made arbitrarily small (compared to Rvi) to reduce its size and cost.

A passive electronic inductor with a transmit signal driver TXA and virtual impedance, according to the present invention, is shown in FIG. 7 (C). The transmit signal is preferably applied to a positive input of an operational amplifier U2 connected to the base of the electronic inductor transistor Q1. Resistor Rvi or impedance Xvi (implemented as a complex circuit 70) is referenced to the output of driver TXA, which is an AC ground with respect to the line signal. Note that the output of TXA is driving an arbitrarily large impedance Rvi and is now adequately protected from high-voltage lightning by the large values of R1 and R2. With switch S1 closed, the circuit uses Rvi and is suitable for operation in the United States and countries with similar impedance requirements. For countries that require a complex impedance, however, switches S2 and S2A are closed. Thus, a single circuit may be used to satisfy worldwide impedance requirements.

Figure 8:
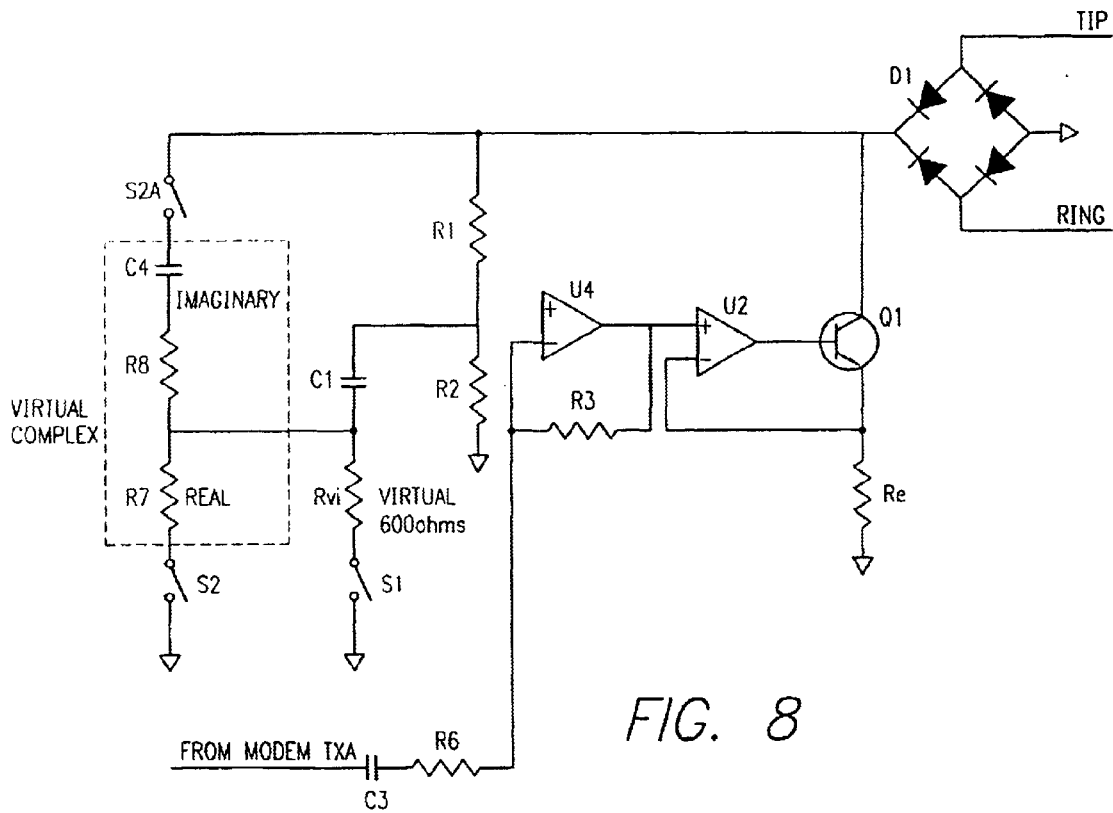
FIG. 8 is a schematic circuit diagram of a passive virtual impedance electronic inductor circuit with an independent transmit driver.

The circuit of FIG. 7 (C) may be modified as shown in FIG. 8. A separate operational amplifier U4 may be used for independently driving the transmit signal from the modem. This embodiment is advantageous for conveniently adjusting the gain of the transmit signal, or for inverting the transmit signal to provide for a simpler echo cancellation scheme for the modem.

Figure 9A:
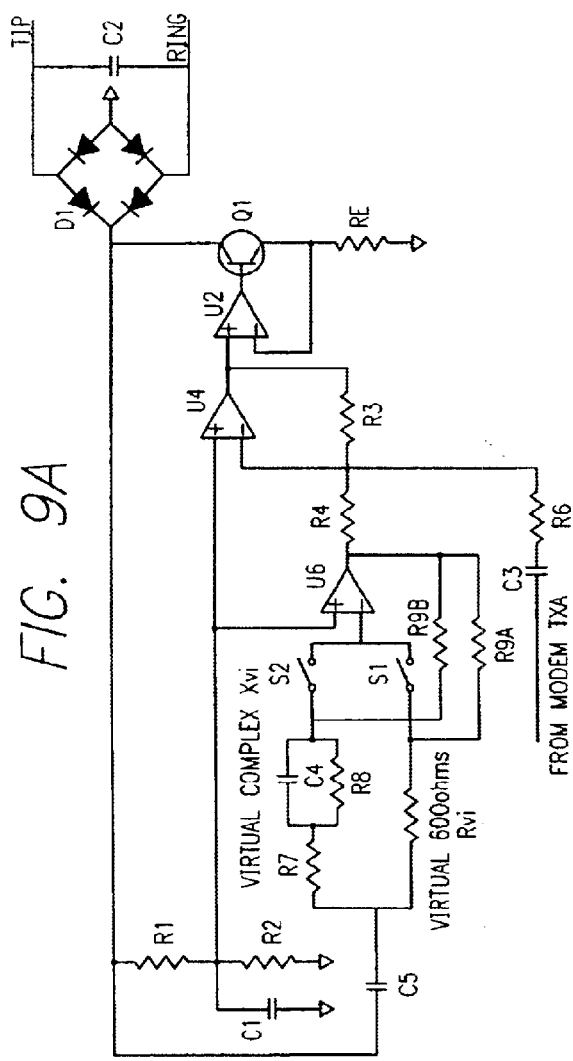
FIG. 9 (A) is a schematic circuit diagram of an active virtual impedance electronic inductor circuit having an independent buffer.
Figure 9B:
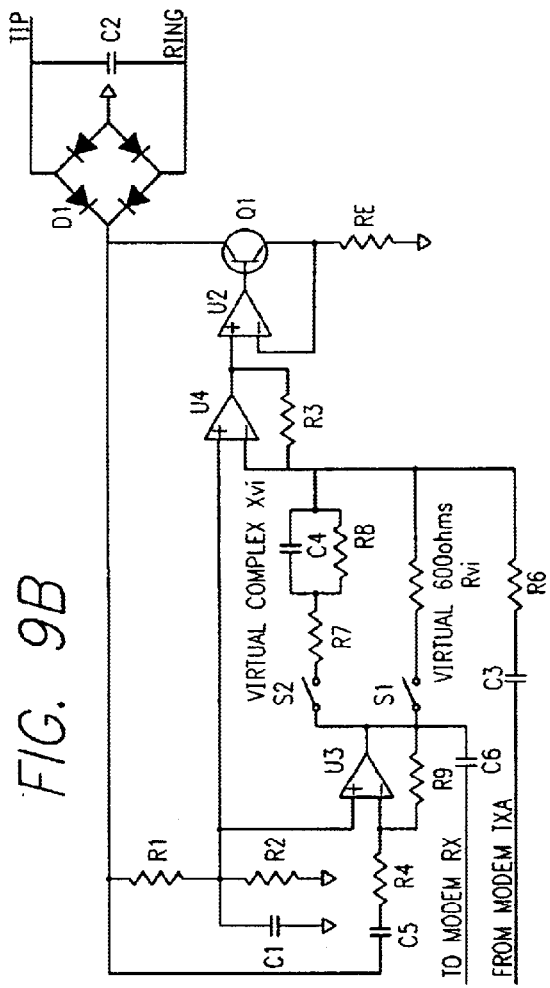

FIG. 9 (A) shows an implementation of the present invention designated as "active" virtual impedance. The components defining virtual impedance are independent of the components that define the DC operating point, even though their effect is actively summed to the contribution of the DC signal path.

In the passive virtual impedance implementation of FIG. 7 (C), for example, the primary function of resistors R1 and R2 is to determine the DC operating point of the electronic inductor, but these resistors also take part in the equation that defines the reflected value of virtual impedance. This configuration is designated as "passive" because the resistor Rvi effectively prevents capacitor C1 from completely shunting the line voltage feedback Vb to ground, and the residual signal Vb determines the virtual impedance effect.

In the active implementation shown in FIG. 9 (A), on the other hand, the resistors R1 and R2 only determine the DC operating point of the electronic inductor because capacitor C1 shunts all the AC signal between R1 and R2 to ground. As a result, resistors R1 and R2 take no part in the equation that defines the virtual impedance.

One disadvantage of the active configuration shown in FIG. 9 (A) is that the voltage feedback from the line, required for virtual impedance, must be provided separately with the addition of an external high-voltage capacitor CS and resistor Rvi (Xvi complex) connected to the line. However, it is possible to eliminate these high-voltage components by sharing the modem receive buffer as the interface to the line for the virtual impedance feedback.

FIG. 9 (B) shows a modem receive buffer U3 used as voltage feedback for the virtual impedance signal. Note that the only high-voltage components required in this configuration are CS and R4, feeding the modem receive buffer U3, which would be required anyway as part of the receive circuit of the modem. A major advantage of this configuration is that the switches S1 and S2, along with the virtual impedance elements Rvi and Xvi, are low-voltage and the impedance values can be conveniently chosen for integration in silicon.

The configurations described above feed both AC and DC into the same transistor Q1, and rely on the transistor Q1 to maintain the required linearity over the wide range of DC line currents (6 mA to 150 mA) found in telephone line networks worldwide. This requirement is rather strict for most transistors, as the linearity curves for transistors degrade substantially as the DC current through the transistor increases.

Figure 10:
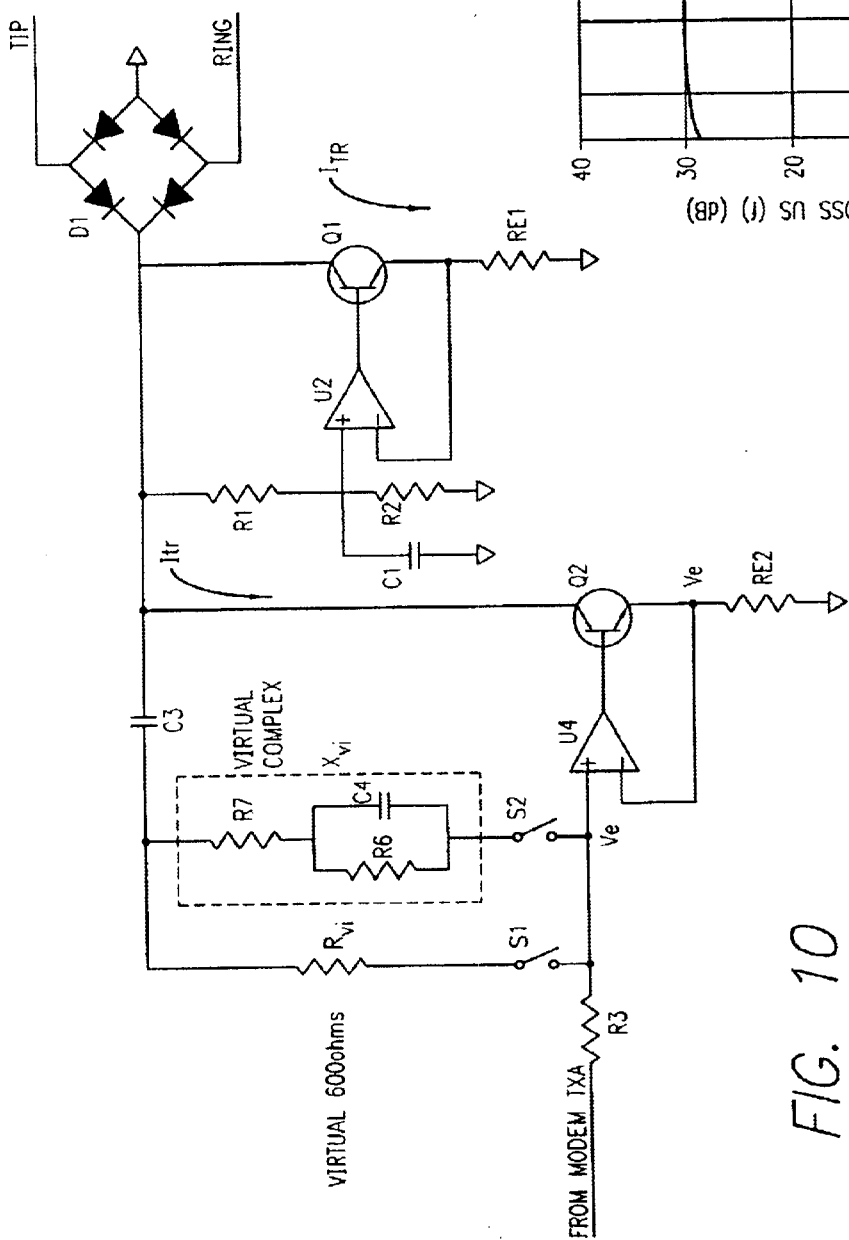
FIG. 10 is a schematic circuit diagram of an active virtual impedance electronic inductor circuit having independent AC and DC drivers.

FIG. 10 illustrates a virtual impedance configuration wherein the AC and DC circuits are separated. The first transistor Q1 is used as described above to control the DC line current, determined by the resistors R1 and R2. The second transistor Q2 controls the AC line current, which includes the virtual impedance feedback and the transmit signal of the modem. The effects of transistors Q1 and Q2 are independently summed to the line through currents ITR and Itr, respectively.

In this configuration, the DC transistor Q1 can be biased in a non-linear region at any current without introducing distortion on the AC signal. Conversely, the AC transistor Q2 can be biased with a sufficiently low current to operate in a linear region and provide excellent linearity in the AC signal transmitted to the line. Furthermore, this configuration allows the emitter resistors R1 and RE2, of transistors Q1 and Q2, to set the gains independently for AC and DC, respectively.

Return loss measures how close the impedance of a modem is to a reference impedance which represents the telephone line. The higher the return loss, in dB, the closer a virtual impedance is to the reference impedance. Generally, a return loss greater than 20 dB is excellent.

Return loss can be calculated according to the following equation:

$$RetLossUS(f) := 20\log\left(\left|\frac{ZvrUS(f) + ZL}{ZvrUS(f) - ZL}\right|\right) \quad \text{For the U.S.}$$

$$RetLossWW(f) := 20\log\left(\left|\frac{Zvr(f) + Zref(f)}{Zvr(f) - Zref(f)}\right|\right) \quad \text{For Europe}$$

Where Zvr US (f) is a.c. virtual impedance seen from T-R in U.S.

ZL is a.c. reference impedance of telephone line in the U.S.

Zvr (f) is a.c. virtual impedance seen from T-R in Europe

Zref (f) is a.c. reference impedance of telephone line in Europe

The virtual impedance seen at the T-R can be calculated according to the following equations:

$$ZvrUS(f) := RE2 \cdot \left[ 1 + \cfrac{Rvi(f) + \cfrac{1}{2 \cdot \pi \cdot f \cdot C3 \cdot j}}{\cfrac{1}{\cfrac{1}{R3}}} \right] \quad \text{For the U.S.}$$

$$Zvr(f) := RE2 \cdot \left[ 1 + \cfrac{\left(Xvi(f) + \cfrac{1}{2 \cdot \pi \cdot f \cdot C3 \cdot j}\right)}{\cfrac{1}{\cfrac{1}{R3}}} \right] \quad \text{For Europe}$$

Where: RE2 is the emitter resistor of Q2

Rvi is the real virtual impedance resistor

C3 is the coupling capacitor the virtual impedance network

R3 is the resistor of the TXA driver

Xvi(f) is the complex impedance of the network

The complex impedance for a network can be calculated according to the following equation:

$$Xvi(f) = R7 + \cfrac{1}{2 \cdot \pi \cdot f \cdot C4j + \cfrac{1}{R6}}$$

Where: R7 is a series resistor of the complex impedance network

R6 is a parallel resistor of the complex impedance network

C4 is the capacitor of the complex impedance network.

Figure 11:
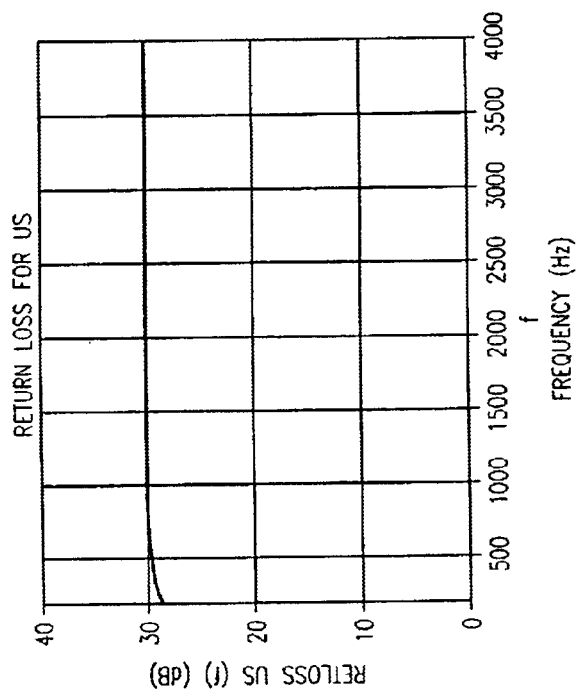
FIG. 11 is a graph of return loss for the United States.
Figure 12:
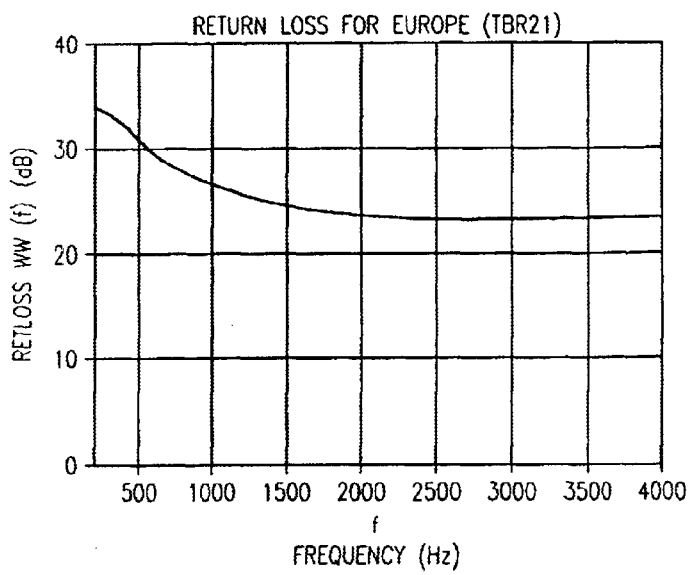
FIG. 12 is a graph of return loss for Europe.
Figure 13:
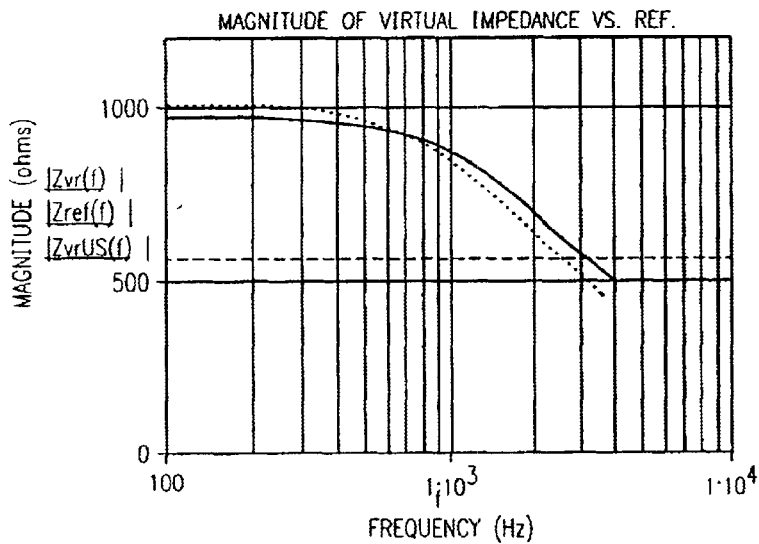
FIG. 13 is a graph of virtual impedance magnitude.
Figure 14:
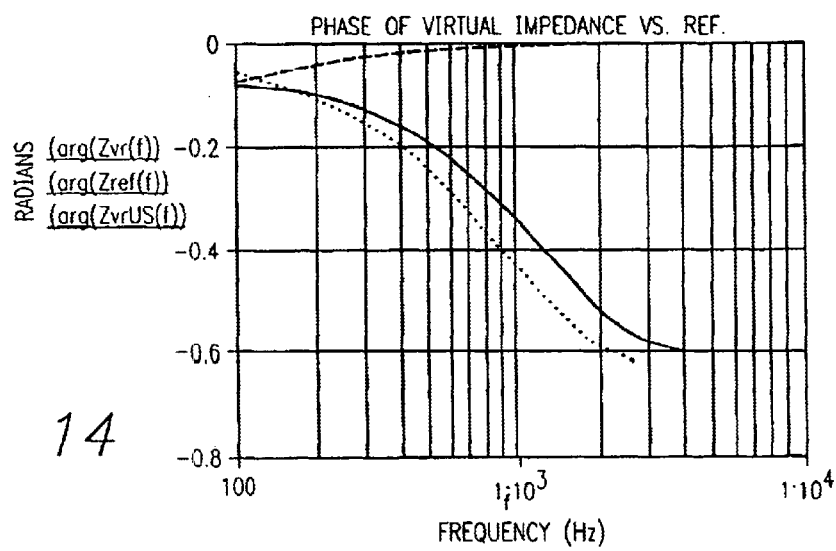
FIG. 14 is a graph of virtual impedance phase.

FIGS. 13 and 14 plot the magnitude of virtual impedance and a reference (the telephone line) and the phase of virtual impedance and a reference for an embodiment. FIG. 11 plots the return loss for the U.S., about 30 dB. FIG. 12 plots the return loss for Europe, about 25 dB. Since any return loss greater than 20 dB is excellent, the test results show that the embodiment performance is satisfactory.

The switches in all the embodiments described herein may be controlled by a microcontroller that is programmed to select the appropriate impedance network.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A telephone line interface circuit comprising:

an electronic inductor transistor;

a voltage feedback network providing feedback from the telephone line to a base of the electronic inductor transistor, wherein the voltage feedback is a negative voltage feedback, wherein the voltage feedback is fed back to the base of the transistor through an operational amplifier; and a separate transmit signal driver buffer connected between the feedback network and the operational amplifier, wherein the electronic inductor transistor operates as a voltage-controlled current source and the voltage feedback from the line controls the current through the circuit, thereby reflecting a "virtual" impedance to the telephone line, wherein both an AC and DC virtual input impedance are created.

2. A telephone line interface circuit comprising:

an electronic inductor transistor;

pas g a voltage feedback network providing feedback from the telephone line to a base of the electronic inductor transistor; and a second transistor, wherein the electronic inductor transistor operates as a voltage-controlled current source and the voltage feedback from the line controls the current through the circuit, thereby reflecting a "virtual" impedance to the telephone line, wherein both an AC and DC virtual input impedance are created, such that the first transistor establishes the DC virtual impedance and the second transistor establishes the AC impedance.

3. A method of creating a virtual impedance in a telephone line interface circuit, the method comprising the steps of:

providing feedback from the telephone line to a base of an electronic inductor transistor;

filtering the feedback to create a desired virtual impedance;

selecting one of a first network and a second network, the first network creating a first virtual impedance, the second network for creating a second virtual impedance;

connecting the one of the first network and the second network to the base of the transistor; and providing a second transistor, such that the first transistor establishes a DC virtual impedance and the second transistor establishes an AC impedance.

* * * * *